June 29, 1954  F. H. KAYLER  2,682,340
TRANSITION COUPLER ARRANGEMENT
Filed April 13, 1949  3 Sheets-Sheet 1
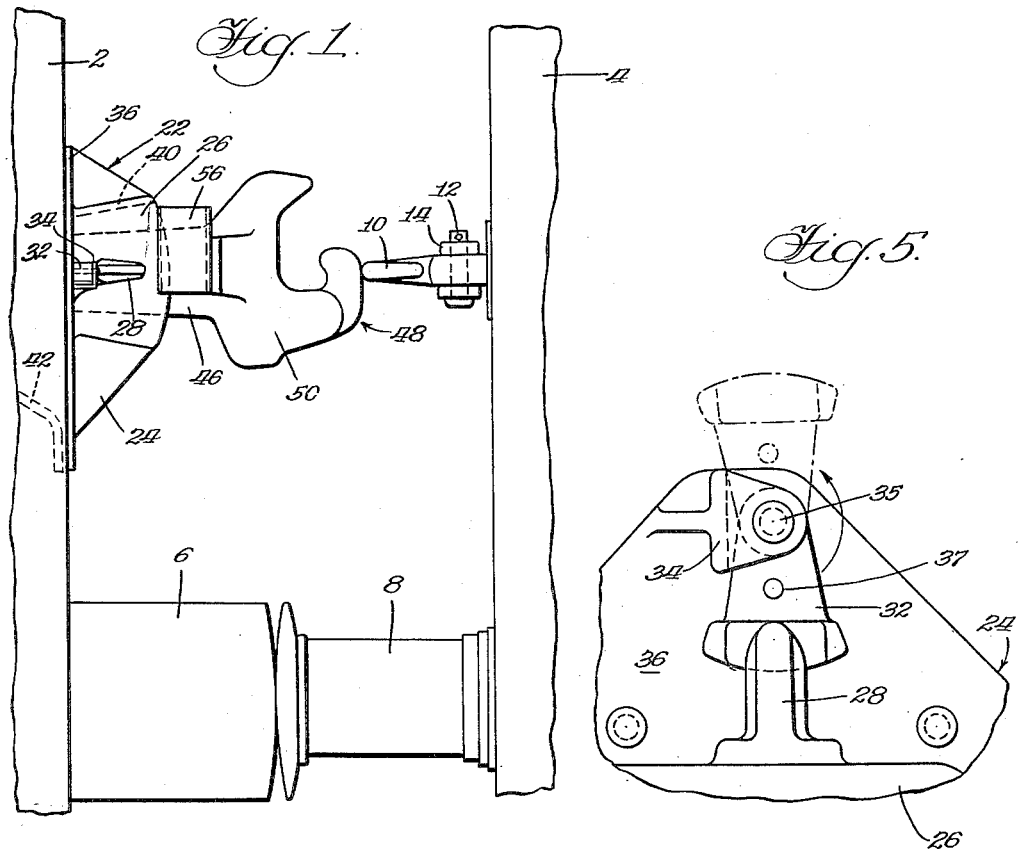
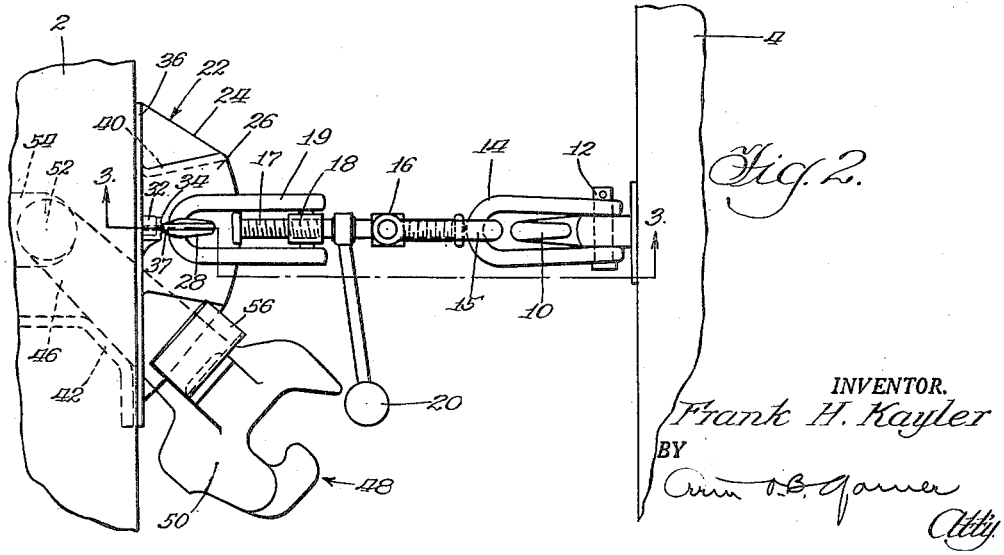
INVENTOR.
Frank H. Kayler
BY

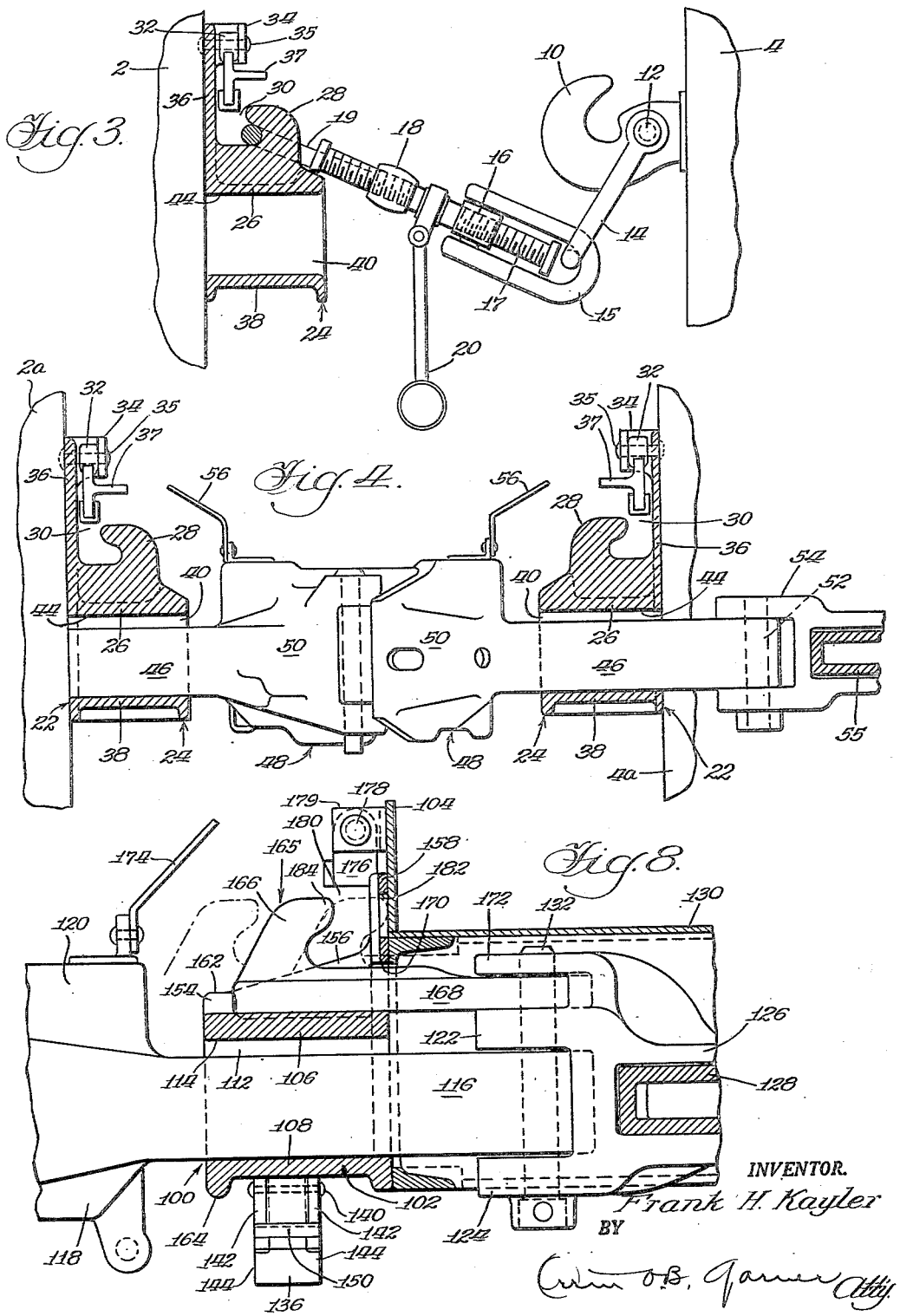

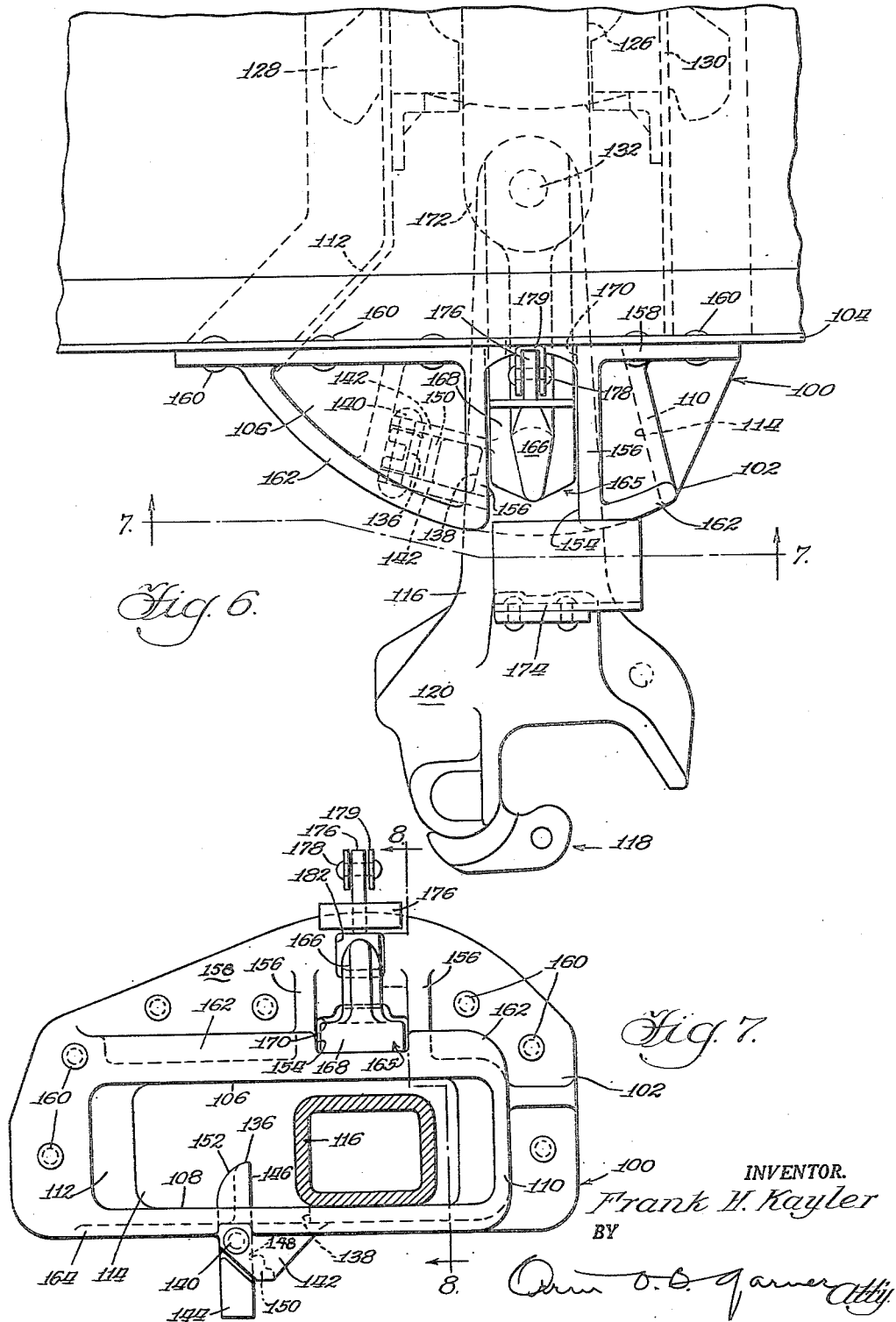

Patented June 29, 1954

2,682,340

UNITED STATES PATENT OFFICE 2,682,340

TRANSITION COUPLER ARRANGEMENT

Frank H. Kayler, Alliance, Ohio, assignor to American Steel Foundries, Chicago, Ill., a corporation of New Jersey Application April 13, 1949, Serial No. 87,251

8 Claims. (Cl. 213—112)

This invention relates to railway coupling equipment and more particularly to transitional coupler mechanism adapted for connection with several different types of coupling devices.

It is common practice in many countries to couple railway cars by a manual coupling of the so-called screw, or hook-and-chain type which is cumbersome and dangerous to operate. For these reasons, and to expedite coupling of cars, steps are being taken in certain countries toward the adoption of a standard automatic coupler such as commonly used in the United States, but inasmuch as the transition from one type to another cannot be made simultaneously, means must be provided for coupling cars with new and old apparatus.

One object of the invention is to provide a simple, durable and efficient transitional coupler mechanism which will meet the various service requirements.

Another object of the invention is to devise a transitional coupler mechanism with parts movable to manual and automatic coupling positions.

A further object of the invention is to provide a coupling arrangement including automatic and manual coupling means, and means for preventing interference therebetween.

A different object of the invention is to provide means which will prevent application of the manual coupling means when the automatic means are being used.

An additional object of the invention is to provide means for positively holding the coupling mechanism in manual coupling position.

A still further object of the invention is to provide an improved locking mechanism for positively locking the manual coupling means.

One embodiment of the invention contemplates the provision of releasable means accommodating movement of the automatic coupling means between manual and automatic coupling positions and functioning to limit lateral angling of said automatic coupling means when in automatic coupling position. This embodiment of the invention also comprehends a unitary transitional coupling arrangement such as described wherein the automatic and manual coupling means are connected to the same draft mechanism whereby both are afforded a resilient connection with an associated car.

These and other objects of the invention will become more apparent from the specification and the drawings, wherein:

Figure 1 is a fragmentary top plan view of the ends of adjacent cars prior to coupling, one of the cars being equipped with a conventional hook coupler and the other with my novel transitional coupler mechanism;

Figure 2 is a view comparable to Figure 1 with the mechanism in manual coupling position and the hook-and-chain coupling applied;

Figure 3 is a longitudinal vertical sectional view taken substantially on the line 3—3 of Figure 2 but showing the hook-and-chain coupling in slackened condition;

Figure 4 is a fragmentary side elevational view, partly in section, of two cars equipped with my novel coupling mechanisms in automatic coupling positions with the automatic couplers mated;

Figure 5 is an enlarged fragmentary front elevational view of the hook coupling latch mechanism;

Figures 6 to 8 illustrate a modification of the invention, Figure 6 being a fragmentary top plan view thereof, Figure 7 a sectional view taken substantially on the line 7—7 of Figure 6, and Figure 8 a sectional view taken approximately on the line 8—8 of Figure 7.

Referring first to Figures 1 to 5, inclusive, the invention is shown in connection with ends 2 and 4 of two adjacent cars provided with buffers 6 and 8 (Figure 1), respectively, buffer 6 being a hollow shell and buffer 8 being of usual resilient design such as used on cars where manual hook-and-chain connections are employed.

In the illustration of Figures 1 to 3, car 4 is provided with a standard manual hook-and-chain coupling including a hook 10 connected to car 4 and pivotally connected as at 12 to a clevis 14 which is connected to a shackle 15, the shackle being pivoted to a trunnion block 16 threaded onto one end of a screw 17. The other end of the screw is threaded into a trunnion block 18 which is pivoted to a shackle 19. It will be understood that the threads at opposite ends of the screw are right and left hand, respectively, and that the screw is rotatable by a handle 20 connected thereto for tightening or loosening the hook-and-chain coupling, as will be readily understood by those skilled in the art.

Car 2 is illustrated equipped with my novel transitional coupling mechanism, generally indicated 22, said mechanism comprising a box-section combination striker and coupler support casting 24 including a top wall 26 with an integrally formed hook or manual coupling 28 thereon for connection with the shackle 19, as shown in Figures 2 and 3.

A latch, as more clearly shown in Figure 5, is arranged to swing across an opening 30 leading to and from the throat of the hook and comprises a weighted member 32 pivoted at its upper end to a jaw 34 formed on a mounting flange 36 of the casting 24. The member 32 pivots as at 35 on a rivet on a substantially horizontal axis extending longitudinally of the associated car and is so balanced that if left in raised position, as shown in phantom lines in Figure 5, a slight jar will cause it to drop to locking position as shown in solid lines. The latch member 32 is provided with a handle 37 intermediate its ends for rotating the member to latching and unlatching positions as indicated by the arrow (Figure 5).

The casting 24 also comprises a bottom wall 38 and spaced side walls 40 and 42 diverging forwardly of the casting and interconnecting the bottom wall 38 with the top wall 26 and defining a pocket 44 therewith, within which is received a shank 46 of an automatic coupler 48. The shank 46 is formed at one end with an integral head 50 containing conventional operating mechanism, such as that of the A. A. R. Standard E coupler, and the other end of the shank is pivoted as at 52 to a yoke 54 associated with a conventional draft mechanism 55, fragmentarily shown in Figure 4 and connected to the framework of car 2 as will be readily understood by those skilled in the art. The coupler 48 is capable of pivoting laterally on a substantially vertical axis and, as shown in Figure 2, is adapted to be swung to one side of pocket 44 against wall 42 to manual coupling position of the mechanism 22 to accommodate coupling of cars 2 and 4 with a hook-and-chain coupling, such as above described.

To prevent the hook-and-chain coupling being damaged through abutment with the coupler 48, as when cars are run-in, causing a slacked condition in the coupling as shown in Figure 3, the coupler 48 is provided on the top side of the head 50 thereof with a guard member 56 comprising an upwardly extending plate or shield, preferably of steel, connected to the head and adapted for abutment with the shackle 19 of the hook-and-chain coupling to prevent coupler 48 from moving thereunder.

The guard 56 also prevents connecting adjacent cars by a hook-and-chain coupling when the mechanism 22 is in automatic coupling position, as shown in Figure 1, with the coupler 48 in longitudinal alignment with the hook 20, or when adjacent cars are coupled by automatic couplers 48, 48 (Figure 4). It will be seen that the guard members 56 protrude upwardly beyond the hooks and cover the hooks when the coupler mechanism 22 is in automatic coupling position, and expose the hooks for manual coupling only when the couplers 48 are moved to manual coupling position of mechanism 22 as shown in Figure 2.

Figure 4 illustrates adjacent cars 2a and 4a each provided with coupling mechanisms 22, with parts corresponding to those shown in Figures 1 to 3 identified by corresponding reference numerals. These mechanisms 22 in Figure 4 are in automatic coupling position to accommodate mating of the automatic couplers 48, 48, thus replacing the hook-and-chain coupling.

Figures 6 and 8 embody a modification of the transitional coupling, generally designated 100, said coupling including a striker and coupler support casting 102 mounted on a framework 104 of a car body, the casting comprising a hollow box-section member including spaced top and bottom walls 106 and 108 interconnected by spaced, forwardly diverging side walls 110 and 112 and forming a pocket 114 therewith through which extends a shank 116 of an automatic coupler 118 identical with coupler 48. The shank is formed integral with a head 120 at its outer end, the head containing the usual locking and coupling mechanism. The inner end of the shank extends between spaced lugs 122 and 124 of a yoke 126 which is operatively associated with a draft mechanism 128 interlocked with a center sill structure 130 of the framework 104. The draft mechanism in the present embodiment and in the one previously described is of the form illustrated in Patent No. 2,003,583, issued by the United States Patent Office to Alfred H. Oelkers on June 4, 1935.

The shank is pivoted to lugs 122 and 124 on a substantially vertical axis by a pin 132 extending through the lugs and shank whereby the coupler is accommodated lateral angling within the pocket 114.

As in the previous embodiment, the coupling 100 is shiftable to automatic coupling position and manual coupling position, depending on whether the mechanism is to be connected to a manual hook-and-chain coupling means or to automatic coupling means. As shown in Figures 6 and 7, the mechanism is in automatic coupling position with the coupler 118 centered in the pocket and slidable on its shank along the bottom wall 108 of casting 102. Lateral angling of the coupler in this position of mechanism 100 is limited in one direction through abutment of one side of the shank 116 with side wall 110 of the casting 102 and in opposite direction by releasable latch or stop means abutable with the opposite side of the shank 116.

The latch means comprises a rigid member 136 extending through a slot 138 in the bottom wall 108 of the casting and pivoted intermediate its ends on a pin or rivet 140 connected to spaced depending lugs 142, 142 formed integral with the bottom wall 108 at opposite sides of slot 138. The lower end of member 136 is weighted by bosses 144, 144 formed thereon, whereby the member 136 is constantly urged to an upright position as shown in Figure 6.

The member 136 is abuttable above its axis of pivot as at 146 (Figure 7) with the shank and below said axis as at 148 with a crosspiece 150 extending between and integral with lugs 142, 142. The member 136 is rotatable manually to a substantially horizontal position into slot 138 to accommodate shifting the coupler to a manual coupling position of mechanism 100 with the shank 116 against side wall 112 of the casting 102. The member 136 is provided with a curved upper edge 152 to permit the shank to slide thereover when the coupler is being moved to centered position.

The top wall 106 of the casting is formed with a groove or channel 154 defined between upright gussets 156, 156 spaced laterally of wall 106 and integral therewith and with an integral upright mounting web 158 extending around the top and the sides of the casting and affording in combination with rivets 160 a securement for the casting with the framework 104. The top and bottom walls 106 and 108 are provided with peripheral flanges 162 and 164, each flange 162 merging at opposite ends with a gusset 156 and the mounting web 158.

A hook or manual coupling, generally designated 165, is mounted in channel 154 for movement longitudinally of the car, and comprises an upstanding hook 166 connected at its lower portion to a bar or extension 168, the latter having slidable movement on the top wall 106 of the casting within channel 154 and extending through an opening 170 in web 158 and being connected at its inner end to yoke 126 by the pin 132 between the lug 122 and a lug 172 integral with the yoke and vertically spaced from lug 122. The hook is thus afforded a yielding action in draft.

With the mechanism 100 in manual coupling position, the coupler 118 is shifted against wall 112 of the casting and the hook is free to be connected to a hook-and-chain coupling. Coupler 118 is prevented from moving under the hook-and-chain coupling by abutment of the guard 174 on the head of the coupler with said hook-and-chain coupling as in the previous embodiment. The guard 174 performs the same function as guard 56 in the previous embodiment and in automatic coupling position of mechanism 100 covers the hook 166 and prevents application of a hook-and-chain coupling thereto, the hook being exposed for manual coupling only when the mechanism is in manual coupling position with coupler 118 moved against wall 112.

The hook 166 is associated with a latch comprising a member 176 pivoted at its upper end on an axis extending transversely of the hook as at 178 to a bracket 179 mounted on the car body, said member 176 being weighted at its lower end and extending across an opening 180 between the hook 166 and web 158 leading to the throat of the hook to prevent the uncoupling of the hook-and-chain coupling associated therewith under sudden jars tending to separate the parts.

The hook coupling is movable with the automatic coupler and, in order to accommodate unrestricted buffing action for the automatic coupler when used, the web 158 is cored out with an opening 182 to permit movement of the end 184 of the hook 166 thereinto as shown in phantom lines in Figure 8.

I claim:

1. In a transitional coupling mechanism for a railway car, a hollow member adapted for connection with said car comprising spaced top and bottom walls and spaced side walls interconnecting said top and bottom walls and defining a pocket therewith, a coupler having a shank extending through said pocket and slidably supported on said bottom wall, a yoke member pivoted to said shank, a draft gear cooperatively associated with said yoke member and said car, said coupler being movable laterally between an operative position and an inoperative position, releasable means in said pocket cooperable with the coupler for maintaining said coupler in its operative position, a manual coupling mounted in a groove in said top wall, and comprising a hook adapted for connection with a hook-and-chain coupling when said coupler is disposed in its inoperative position, a rigid member connected to said hook and to said yoke member, and means on said coupler for shielding said hook when said coupler is disposed in its operative position to prevent connection of said hook to said hook-and-chain coupling and exposing said hook when said coupler is in said inoperative position to accommodate connection of said hook with said hook-and-chain coupling, said means being abuttable against said hook-and-chain coupling when the same is connected to said hook to prevent said coupler from moving to its operative position.

2. In a transitional coupling arrangement, the combination of two cars, a hook-and-chain coupling on one car, a hollow member with a pocket carried by the other car, a coupler extending through said pocket, a yoke member pivotally connected with said coupler, draft gear means cooperatively associated with said yoke member and the related car, said coupler having a head disposed outwardly of said hollow member, a hook element connected to said yoke member and to said hook-and-chain coupling, said coupler being shiftable to one side of said pocket, and means carried by said head engageable with said hook-and-chain coupling to prevent shifting of said coupler in longitudinal alignment with said hook-and-chain coupling.

3. In a railway coupling mechanism for a railway car; the combination of a yoke, draft gear means connected to the yoke and car for cushioning relative fore and aft movement therebetween, a coupler pivotally connected to said yoke and having a coupler head projected longitudinally beyond said car, a coupler of different character connected to said yoke and projecting longitudinally beyond said car, and means on said car confining said last mentioned coupler against movement relative to the car laterally thereof, said means accommodating movement of the last mentioned coupler fore and aft of the car, said couplers being selectively engageable with coupling means on other cars.

4. In a coupling arrangement, a hollow member adapted to be secured to a car body and comprising a coupler pocket, a coupler slidably supported on said member within said pocket for movement laterally therein, and releasable stop means in said pocket cooperable with said coupler for limiting lateral movement of said coupler within said pocket, said stop means comprising an element pivoted between its ends to said member, one end of said element projecting into said pocket for engagement with one side of said coupler, said element being pivotal to a position whereat said one end is out of said pocket, without disassembling said element from said member, whereby said coupler is accommodated lateral movement within the limits defined by the lateral sides of said pocket.

5. In a coupling ararngement, a hollow member adapted to be secured to a car body and comprising a coupler pocket, a coupler slidably supported on said member within said pocket for movement laterally therein, and releasable stop means in said pocket cooperable with said coupler for limiting lateral movement of said coupler within said pocket, said stop means comprising an element extending through a slot in said member and pivoted to said member on a substantially horizontal axis, said element being pivotal to a position disposing one end of said element within said pocket and to another position out of said pocket whereat said element is disposed substantially within said slot lengthwise thereof.

6. In a transitional coupling mechanism for a railway car; the combination of a support having a top wall, a hook coupler having a shank, tongue and groove means connecting the shank to the wall for accommodating reciprocal movement of said shank lengthwise of said coupling arrangement, a pivotal coupler having a shank supported by said support, and draft gear means connected to the shanks of both couplers, said pivotal coupler being pivotal in a substantially horizontal plane between operative and inoperative positions, and said hook coupler being restricted to reciprocal movement along said tongue and groove means.

7. In a transitional coupling arrangement, a support having a top wall, a groove in the top wall extending longitudinally of the coupling arrangement, a hook coupler having a shank slidable within the groove, a pivotal coupler having a shank seated on said support, and draft gear means connected to said shank of the pivotal coupler and said shank of the hook coupler, said pivotal coupler being rotatable in a substantially horizontal plane between operative and inoperative positions, and said hook coupler being restricted to reciprocal movement within said groove.

8. In a transitional coupling arrangement; the combination of two cars, a releasable hook and chain coupling connected to said cars, said coupling comprising a hook carried by one of said cars and fixed thereto against movement laterally thereof, draft gear means carried by said one car, a coupler having a shank disposed below said hook and pivoted to said draft gear means for pivotal movement laterally of said one car beneath the hook, said draft gear means cushioning relative fore and aft movement between the coupler and said one car, and a projection on said coupler extending upwardly therefrom for engagement with said coupling to prevent shifting of said coupler into longitudinal alignment with said coupling.

References Cited in the file of this patent

UNITED STATES PATENTS

| Number | Name | Date |
|---|---|---|
| 1,434,811 | Floyd | Nov. 7, 1922 |
| 1,449,229 | Henrikson | Mar. 20, 1923 |
| 1,476,869 | Bazeley | Dec. 11, 1923 |
| 1,580,623 | Metzger et al. | Apr. 13, 1926 |
| 2,003,583 | Oelkers | June 4, 1935 |
| 2,058,018 | Holmes | Oct. 20, 1936 |
| 2,176,842 | Kayler | Oct. 17, 1939 |
| 2,632,573 | Meyer | Mar. 24, 1953 |

FOREIGN PATENTS

| Number | Country | Date |
|---|---|---|
| 517,370 | France | May 4, 1921 |